United States Patent [19]
Perego

[11] Patent Number: 5,340,049
[45] Date of Patent: * Aug. 23, 1994

[54] METHOD AND APPARATUS FOR FINDING ONE END OF TAPE WOUND ONTO A REEL

[75] Inventor: Luciano Perego, Milan, Italy

[73] Assignee: Tapematic U.S.A., Inc., Orlando, Fla.

[ * ] Notice: The portion of the term of this patent subsequent to Jun. 16, 2009 has been disclaimed.

[21] Appl. No.: 898,805

[22] Filed: Jun. 15, 1992

Related U.S. Application Data

[63] Continuation-in-part of Ser. No. 585,595, Sep. 20, 1990, Pat. No. 5,121,886.

Foreign Application Priority Data

Aug. 6, 1990 [IT]  Italy ................................ 21226A/90

[51] Int. Cl.⁵ ............................................. B65H 23/00
[52] U.S. Cl. ............................... 242/332.2; 242/332.4
[58] Field of Search ................... 242/57, 78.8, 58.4, 242/188, 195; 226/91, 92

[56] References Cited

U.S. PATENT DOCUMENTS

| | | | |
|---|---|---|---|
| 3,643,889 | 2/1972 | Krause | 242/195 X |
| 4,091,426 | 5/1978 | Umeda | 360/74 |
| 4,543,152 | 9/1985 | Nozaka | 242/57 X |
| 4,657,198 | 4/1987 | Shimizu et al. | 242/57 |
| 4,721,263 | 1/1988 | Miyazaki | 242/78.8 |
| 4,913,366 | 4/1990 | Andou | 242/57 |
| 4,957,245 | 9/1990 | Spinner | 242/35.5 A |
| 5,121,886 | 6/1992 | Perego | 242/57 |

FOREIGN PATENT DOCUMENTS 0281884  9/1988  European Pat. Off. .

Primary Examiner—Daniel P. Stodola
Assistant Examiner—John Q. Nguyen
Attorney, Agent, or Firm—Edgar H. Haug; Adam L. Brookman

[57] ABSTRACT

In an automatic cassette loading machine, a pancake is mounted on a rotatable support hub. A reading member, movable with respect to the axis of the pancake, is moved until it is across from the pancake. It is then moved across the pancake such that it detects the peripheral edge of the pancake as the reading member passes beyond the pancake. The pancake is thereafter rotated until a projecting end of the tape on the pancake is located in a predetermined position. This enables the end of tape to be picked up by a grasping member associated with the cassette loading machine.

17 Claims, 4 Drawing Sheets

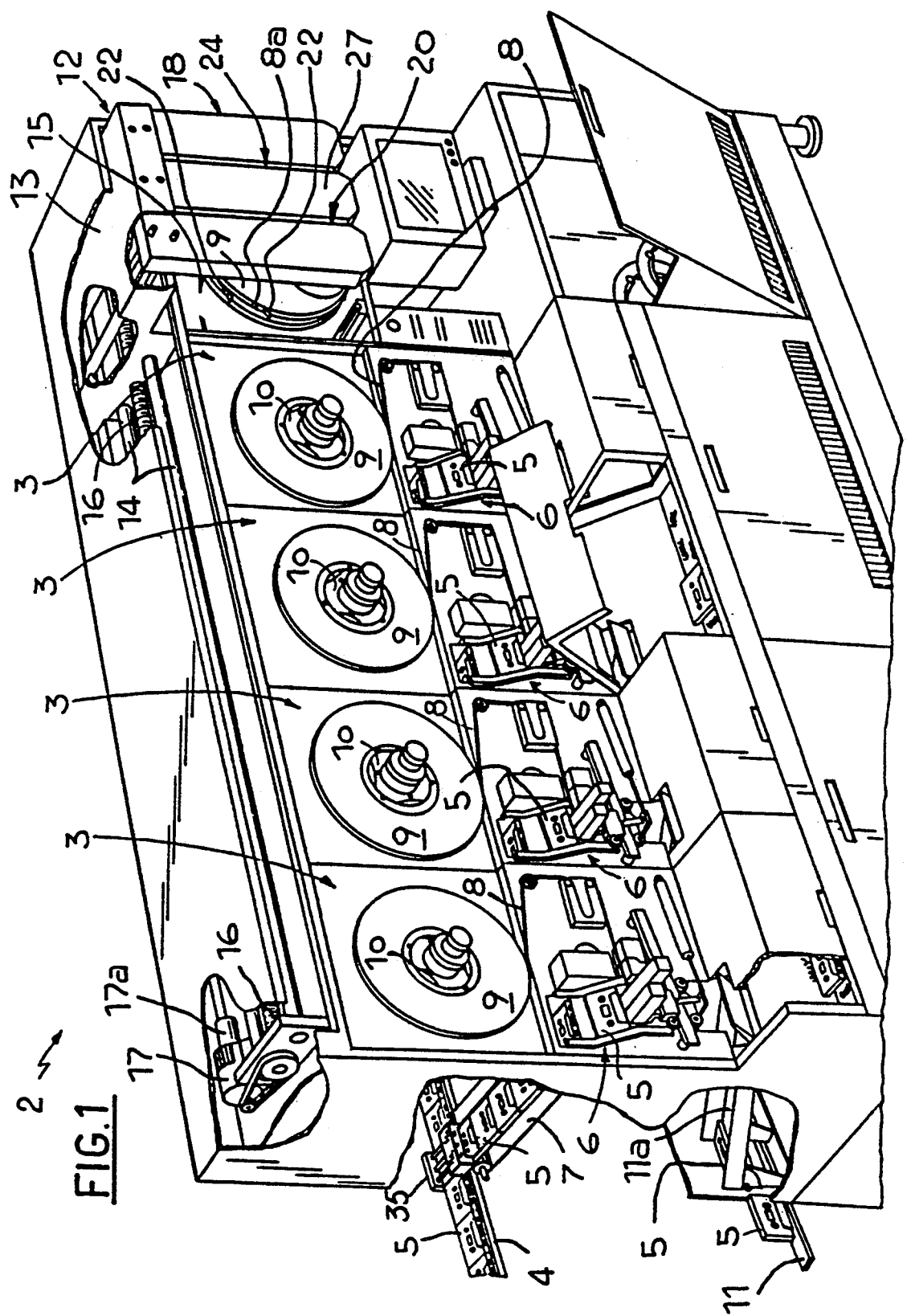

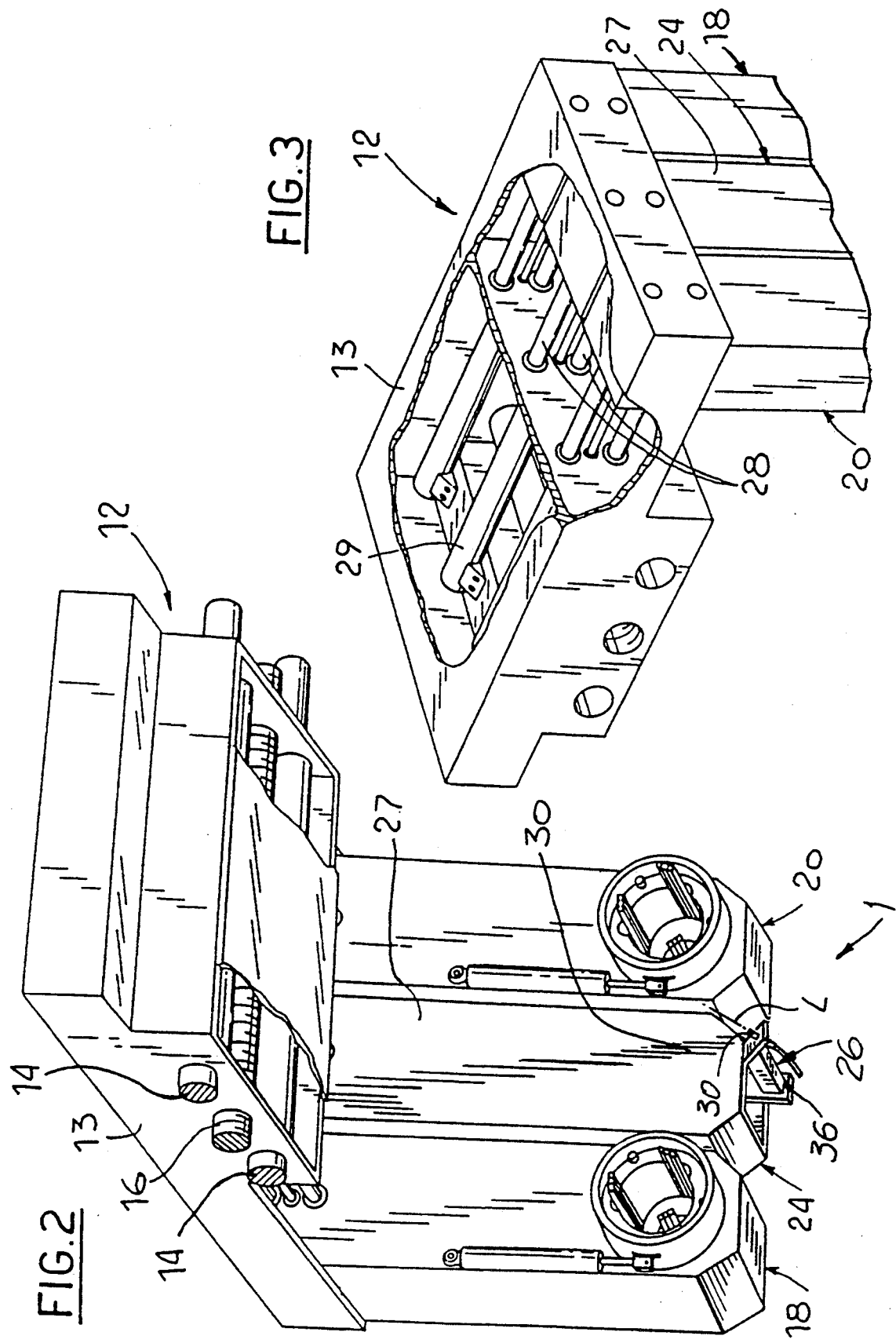

METHOD AND APPARATUS FOR FINDING ONE END OF TAPE WOUND ONTO A REEL

The present application is a continuation-in-part of U.S. Application Ser. No. 07/585,595, filed Sep. 20, 1990, now U.S. Pat. No. 5,121,886, entitled Process and Apparatus for Finding One End of Tape Wound Onto a Reel.

BACKGROUND OF THE INVENTION

The present invention relates generally to automatic tape loading machines and more particularly to a method and apparatus for finding one end of tape wound onto a reel.

Typically, the loading of tape cassettes has been carried out in semi-automatically operated loading machines. In these machines the cassettes to be loaded are automatically fed, one at a time, to a loading station. While in the loading station, a predetermined amount of magnetic tape, coming from a supply reel of tape mounted on a rotatable support hub, is wound into a cassette.

Generally, these loading machines are automated so that manual intervention in operation is substantially limited to the supply of empty cassettes into magazines associated with the machines and/or the periodic replacement of empty pancakes (see e.g. U.S. Pat. Nos. 4,836,464 and 5,125,587).

Despite this degree of automation the execution of these manual operations limits the number of machines which can be entrusted to a single operator.

Frequently, in order to replace an empty pancake, the operator, after removing the empty pancake and replacing it with a new one, must manually pick up the tape end of the new pancake and guide it, in a predetermined path, between different components of the loading machine (see e.g. U.S Pat. No. 4,602,748). The time necessary for carrying out this operation greatly reduces the ability of an operator to manage several loading machines.

Thus, clear benefit would be derived if tape loading machines were able to automatically locate and pick up the tape end from the new pancake mounted on the hub and thereafter thread the tape between the different components of the loading machine.

The same Applicant has devised an apparatus capable of performing the pickup and threading functions which is the object of U.S. Patent Application Ser. No. 07/585,809 in the name of the same Applicant entitled Tape Threading Apparatus which is incorporated herein by reference.

The same Applicant has also developed a tape loading apparatus equipped with a plurality of loading modules each having a loading station where cassettes are loaded with tape. In this apparatus, the replacement of empty tape pancakes associated with the different modules is carried out automatically by a manipulating unit. The loading machine as well as the manipulating unit associated therewith are the subject matter of U.S. Patent Application Ser. Nos. 07/585,395, now U.S. Pat. No. 5,125,587, and 07/585,710 filed in the name of the same Applicant entitled Tape Loading Center and Apparatus for Supplying Tape Machines with Reels of Tape respectively, which are incorporated herein by reference.

The apparatus for picking up the tape from the pancake can perform its functions only if the pancake, after being mounted on the hub, is disposed in such a manner that the end of the tape wound thereon is located at a point from which it can be easily picked up by a grasping element associated with the apparatus. Since the pancake is most easily mounted on the hub in a completely random manner, the apparatus for picking up the tape is preferably assisted by means capable of finding the tape end on the circumference of the pancake.

SUMMARY OF THE INVENTION

The main object of the present invention is to provide a method and apparatus capable of automatically locating an end of the tape on a supply reel ("pancake").

Another object of the present invention is to automatically place an end of the tape on a supply reel in a predetermined position.

Yet another object of the present invention is to provide a method and apparatus capable of automatically detecting an end of the tape on a supply reel without the necessity of knowing the maximum potential diameter of a reel of tape.

The foregoing and other objects, which will become more apparent in the course of the present description, are substantially attained by a method for finding the end of the tape wound onto a pancake comprising the steps of: mounting the pancake on a support hub; positioning a reading member at a position spaced apart from the pancake; moving the reading member close to the pancake; moving the reading member across the pancake to detect the peripheral edge of the pancake and then to a predetermined distance beyond the peripheral edge; moving the reading member back towards the pancake until it is a predetermined distance from the pancake's peripheral edge; rotating the pancake in a first direction until the reading member detects a free end of tape; rotating the pancake in a second direction until the free end of tape is in a predetermined position.

The above method is put into practice by an apparatus comprising: a main carriage movable at right angles to the pancake axis; a reading member carried by the main carriage close to and away from the pancake so that it may intercept a free end of tape; reflector means for returning the optical signal generated by the reading member and means to stop the pancake rotation when the free end of tape is in a predetermined position.

In the drawings:

BRIEF DESCRIPTION OF THE DRAWINGS

FIG. 1 is a partial cutaway, perspective fragmentary view of one embodiment of a tape loading apparatus, to which the apparatus of the present invention has been associated;

FIG. 2 is a partial cutaway perspective fragmentary view of a portion of the apparatus of one embodiment of the present inventions mounted on a manipulating unit;

FIG. 3 is a partial cutaway perspective fragmentary view of one embodiment of the manipulating unit seen from the side opposite that shown in FIG. 2;

DETAILED DESCRIPTION

Figure 4:
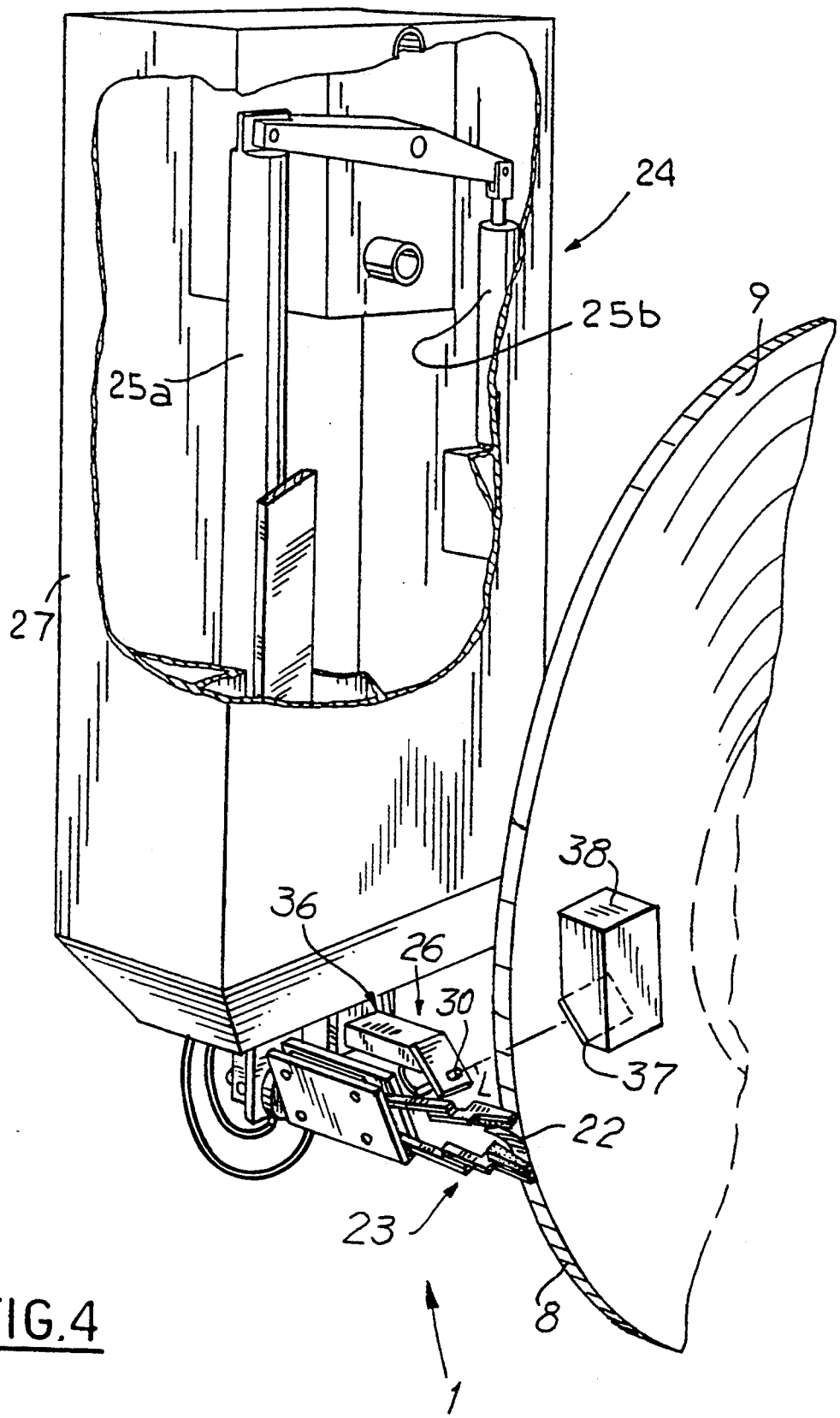
FIG. 4 is a detailed partial cutaway perspective view of one embodiment of the manipulating unit emphasizing the structure of a portion of one embodiment of the apparatus of the invention.

Referring to FIGS. 2 and 4, the major portion of one embodiment of an apparatus made in accordance with the present invention has been generally identified by reference numeral 1.

In the embodiment shown, apparatus 1 is associated with one embodiment of a tape loading apparatus generally referenced by 2 in FIG. 1. Only the essential parts of the machine will be briefly described herein as the machine has been disclosed in detail in the Patent Application entitled Tape Loading Center previously incorporated by reference.

The machine 2 has a number of loading modules 3 disposed in side-by-side relation, to which a plurality of cassettes 5 are sent by a supply conveyor 4. The cassettes are transferred from the supply conveyor 4 to a plurality of infeed conveyors 7 by pusher mechanisms 35. The infeed conveyors 7 feed the cassettes to a plurality of loading stations 6 each associated with a loading module 3. The cassettes 5 are fed one at a time to the loading stations 6 and loaded with magnetic tape 8 fed from pancakes 9 rotatably mounted on support hubs 10. When the loading has been completed, cassettes 5 are released from the loading station 6 and preferably removed from the machine 2 through a discharge chute 11a terminating at a discharge conveyor 11.

When one of the pancakes 9 is out of tape 8, a manipulating unit, generally identified by 12, is operated to remove the empty pancake and replace it with a new full pancake. A supply magazine 15 which supports a plurality of full pancakes 9 is the source for the replacement pancake.

The manipulating unit 12 comprises a main carriage 13 movable along guide bars 14, relative to the pancakes 9 mounted on the hubs 10. The main carriage 13 is preferably driven by a worm screw 16 which, is in turn, driven by a motor 17 controlled by an encoder 17a. The manipulating unit 12 is also provided with at least one supply/discharge module 18 designed to pick up full pancakes 9 from the supply magazine 15 and replace empty pancakes on the hubs 10.

In practice, after picking up a pancake 9 from the magazine 15 with the supply/discharge module 18, the manipulating unit 12 moves along the guide bars 14 until it comes into register with the loading module 3 in which the pancake 9 needs to be replaced. At this point, assuming two supply/discharge modules 18 and 20 are employed, the second supply/discharge module 20 automatically removes the out of tape pancake 9 from the support hub 10. The manipulating unit 12 then moves forward along the guide bars 14 for a short distance, to bring the supply/discharge module 18 in front of the hub 10 to fit the new pancake 9 on the hub 10.

The structure and operation of the supply/discharge modules 18 and 20, the supply magazine 19 and the hub 10 are not further described as they are discussed in detail in the Patent Application entitled Apparatus for Supplying Tape Loading Machines With Reels of Tape, previously incorporated by reference.

As shown in FIG. 1, each pancake 9 located in the supply magazine 15 has one free end portion 22 oriented outwardly from the pancake 9.

When the pancake 9 has been engaged on a particular support hub 10, the free end portion 22 is randomly located at any point on the circumference of the pancake 9. In accordance with the present invention, it is preferable that the free end portion 22 be disposed in a predetermined position so that it may be easily picked up by a grasping member 23 associated with a setup module 24 (part of the manipulating unit 12). The grasping member 23, (not described in detail herein as it is discussed in detail in the Patent Application entitled Tape Threading Apparatus previously incorporated by reference), is movable in a vertical direction upon command of one or more fluid-operated cylinders 25a, 25b so that it causes the held end 22 of the tape 8 to travel in a predetermined path between different components of the corresponding loading module 3. This movement occurs simultaneously with the displacement of the main carriage 13 along the guide bars 14.

In order to orient the free end portion 22 in a position adapted for pick up by the grasping element 23, a reading member 26 is provided. The reading member 26 is fastened to an extension arm 36 which is affixed to a support arm 27 that is part of the setup module 24. The support arm 27 extends vertically downwardly from the main carriage 13 and is connected to the main carriage 13 by a pair of guide bars 28 which allow the arms 27 and 36 to move relative to the pancakes 9 upon command of a fluid-operated actuator 29 (see FIG. 3). As a result of this movement, the reading member 26 is shifted from a rest position, in which it is axially spaced apart from the pancakes 9 so that it does not interfere with the support hubs 10 when the main carriage 13 is moved, to an operating position in which it is closer to the pancake 9 mounted on the support hub 10.

Preferably, the reading member 26 comprises a two channel fiber sensor 30 designed to emit a light beam shown in dotted lines and referenced by "L". The beam "L" is reflected back toward the fiber sensor by a reflector 37 preferably mounted on an inclined block 38 mounted on the front wall 4 of the machine 2. (The fiber sensor's first channel sends the light beam "L" and the second channel collects reflected light). The sensor 30 is suitably inclined (preferably in the range of 30° to 60° and is ideally equal to 4°), relative to the axis of the pancake 9, to emit the light beam "L" which will be broken by a free end portion 22. The angle of inclination of the light beam "L" relative to the axis of the pancake 9 preferably is in the range of 30° to 60° and is ideally equal to 45°.

Figure 5:
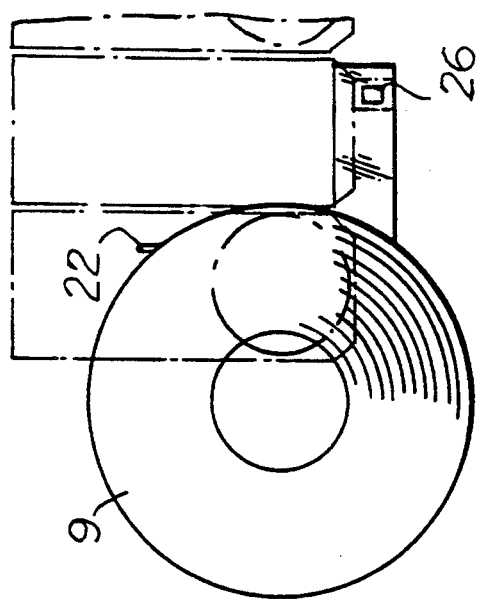
FIGS. 5, 6, 7 and 8 are diagrammatic front views of the steps of the method of finding the end of a tape wound onto a pancake.

After the new pancake 9, is mounted on a support hub 10 by means of the supply/discharge module 18, the support arm 27 is moved toward the pancake 9, so that the reading member 26 is in its working position. In this situation, the relative positioning between the reading member 26 and the pancake 9 is as shown in FIG. 5.

Figure 6:
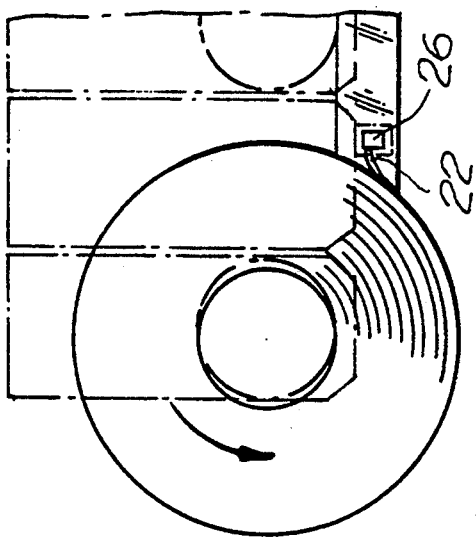

The main carriage 13 is moved along the guide bars 14 under the control of encoder 13a so that the reading member 26 moves across the pancake 9. When the reading member 26 first gets a reflection from the reflector the peripheral edge of the reel is located. The reading member is then stopped at a predetermined distance spaced apart from the pancake 9 in front of the reflector 37, as shown in FIG. 6.

Figure 7:
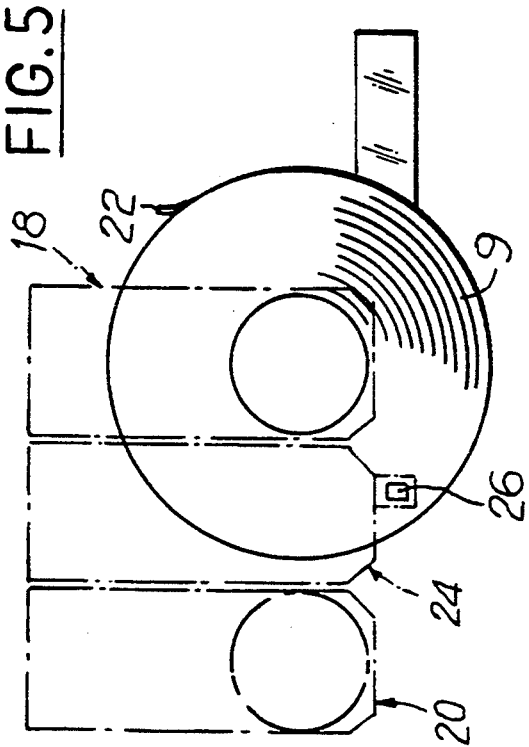

At this point, the support arm 27, upon command of the actuator 29, moves back a predetermined distance, closer to the pancake 9, in order to bring the reading member 26 to a position adjacent the peripheral edge of the reel in which it can detect the free end portion 22, as shown in FIG. 7.

Figure 8:
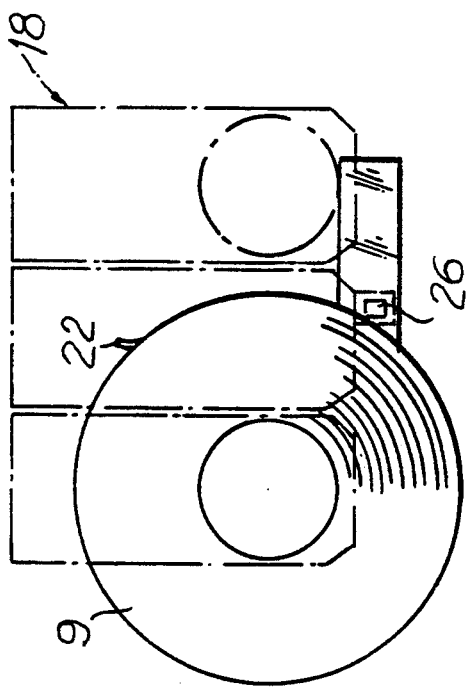

At this point, the reel 9 is rotated to bring the free end portion 22 into a position to be detected by the reading member 26, as shown in FIG. 8. As soon as the light beam "L" is broken by the free end portion 22, the reading member 26 will generate a signal to a microprocessor 39 (shown in FIG. 1) to indicate the need to stop the rotation of the pancake 9. The microprocessor then signals a motor (not shown) which drives the corresponding support hub 10 to actually stop the pancake's rotation. The pancake is then immediately rotated in the opposite direction, at a slow speed, to cause the free end portion 22 to break the beam "L" a second time. Signals to stop the rotation of the pancake 9 are generated again and the free end portion 22 is thus disposed in a predetermined position. (If control of the pancake's rotation and the sensor's sensitivity are sufficient, the reversal of rotation can be undertaken to put the free end portion 22 in a predetermined position without the necessity of redetecting the free end.)

The main carriage 13 is then moved further toward the pancake 9, a predetermined distance, to bring the grasping member 23 into position to engage the free end portion 22b. A further movement of the main carriage B, to the right or left, may be necessary to complete the engagement positioning of the grasping member 23 depending upon its location vis-a-vis the reading member 26.

The method and apparatus of the present invention make it possible to find the end of tape wound onto a supply reel in a quick and precise manner so as to enable the end of the tape to be engaged by an automatic device adapted to thread the tape through components of a cassette loading machine and prepare it for loading cassettes.

The method and apparatus of the present invention operate to reliably locate the end of tape on a reel regardless of the outside diameter of the pancakes used.

Although the present invention has been described with reference to a specific embodiment, neither the exact described operation, nor the specific structure mentioned should be construed as limiting since the disclosed embodiment is merely illustrative of the invention. One of skill in the art may alter the described embodiment without departing from the spirit or scope of the invention.

I claim:

1. A method to locate an end of magnetic tape wound onto a reel comprising the following steps:
   mounting a reel of tape on a support hub driven by a motor;
   positioning a reading member at a location in front of the reel;
   automatically moving the reading member across the reel, detecting the peripheral edge of the reel and stopping the reading member a predetermined distance beyond the detected peripheral edge of the reel;
   automatically moving the reading member a predetermined distance back, towards the peripheral edge of the reel;
   rotating the reel;
   automatically detecting a projecting end of the magnetic tape extending outwardly from the reel; and
   automatically stopping the reel rotation when the reading member detects said projecting end.

2. A method according to claim 1, further comprising the step of reversing the rotation of the reel to place the projecting end in a predetermined position.

3. A method according to claim 2, wherein said member detects the projecting end a second time when the rotation of the reel is reversed.

4. A method to locate an end of magnetic tape wound onto a reel comprising the following steps:
   mounting a reel of tape on a support hub driven by a motor;
   positioning a reading member in a position in which said reading member reads the presence of said reel;
   automatically moving the reading member across said reel to a position a predetermined distance from the peripheral edge of said reel, which edge is detected by said reading member as it traverses said reel;
   rotating the reel;
   automatically detecting a projecting end extending outwardly from said reel; and
   automatically stopping the reel rotation when the reading member detects said projecting end.

5. A method according to claim 4, further comprising the step of reversing the rotation of the reel to place the projecting end in a predetermined position.

6. A method according to claim 5, wherein said member detects the projecting end a second time when the rotation of the reel is reversed.

7. An apparatus for locating an end of magnetic tape wound on a reel comprising:
   a rotatable support hub, driven by a motor, adapted to operatively engage the reel;
   an arm movable relative to said support hub;
   a reading member carried by said arm, wherein said reading member is movable close to the reel to establish reading contact with the reel, movable across the face of the reel to a position beyond the peripheral edge of the reel whereby the location of the peripheral edge of the reel is detected and movable to a predetermined distance back, toward the peripheral edge of the reel to detect a projecting end of the magnetic tape wound on the reel; and
   signal generating means for signalling the motor driving said support hub to stop the rotation of the reel in response to the detection of said projecting end.

8. An apparatus according to claim 7, wherein said reading member comprises a two channel fiber sensor.

9. An apparatus according to claim 7, further comprising reflector means for reflecting a light beam, emitted by said reading member, back toward said reading member.

10. An apparatus according to claim 7, wherein said reading member emits a light beam inclined to the axis of the reel.

11. An apparatus according to claim 10, wherein said reading member emits a light beam inclined at an angle in the range of 30° to 60° to the axis of the reel.

12. An apparatus according to claim 11, further comprising reflector means for reflecting the light beam emitted by said reading member, back toward said reading member.

13. An apparatus according to claim 12, wherein said reflector means is mounted at an angle in the range of 30° to 60° to the axis of the reel.

14. An apparatus according to claim 13, wherein said reflector means is mounted at an angle of approximately 45° to the axis of the reel.

15. An apparatus according to claim 14, wherein said reading member emits a light beam inclined at an angle of approximately 45° to the axis of the reel.

16. An apparatus according to claim 7 wherein said movable arm is associated with a grasping member which picks up the projecting end and thereafter threads the magnetic tape between different members of a cassette loading machine.

17. An apparatus for locating an end of magnetic tape wound on a reel comprising:
- a rotating support hub releasably supporting a reel;
- movable arm means for executing movements relative to said support hub;
- detector means connected to said movable arm means for detecting the proximity of physical elements, wherein said detector means is moved across the reel to a position beyond the peripheral edge of the reel such that said detector means detects the location of the peripheral edge of the reel and, wherein said detector means thereafter detects a projecting end of the magnetic tape wound on the reel.

* * * * *